United States Patent
Combs

(10) Patent No.: US 9,951,969 B2
(45) Date of Patent: Apr. 24, 2018

(54) INSULATED REGISTER BOX AND METHOD FOR FORMING AN INSULATED REGISTER BOX

(71) Applicant: Sterling Kidd Combs, Magnolia, TX (US)

(72) Inventor: Sterling Kidd Combs, Magnolia, TX (US)

(73) Assignee: STERLING CUSTOM SHEET METAL, INC., Magnolia, TX (US)

( * ) Notice: Subject to any disclaimer, the term of this patent is extended or adjusted under 35 U.S.C. 154(b) by 528 days.

(21) Appl. No.: 14/668,079

(22) Filed: Mar. 25, 2015

(65) Prior Publication Data
US 2016/0282009 A1    Sep. 29, 2016

(51) Int. Cl.
| | |
|---|---|
| F24F 7/00 | (2006.01) |
| F24F 13/06 | (2006.01) |
| F24F 13/08 | (2006.01) |
| B29C 41/20 | (2006.01) |
| B29C 44/18 | (2006.01) |
| B29K 75/00 | (2006.01) |
| B29K 105/00 | (2006.01) |
| B29C 44/36 | (2006.01) |

(52) U.S. Cl.
CPC ............ *F24F 13/082* (2013.01); *B29C 41/20* (2013.01); *B29C 44/18* (2013.01); *F24F 13/06* (2013.01); *B29C 44/36* (2013.01); *B29K 2075/00* (2013.01); *B29K 2105/0058* (2013.01); *B29K 2995/0015* (2013.01)

(58) Field of Classification Search
CPC ......... F24F 13/082; F24F 13/06; B29C 41/20; B29C 44/18
See application file for complete search history.

(56) References Cited

U.S. PATENT DOCUMENTS

| | | | | |
|---|---|---|---|---|
| 3,086,443 A | * | 4/1963 | Doolittle | E06B 7/082 454/309 |
| 3,251,382 A | * | 5/1966 | Tatsch | F16L 9/003 138/151 |
| 3,559,560 A | * | 2/1971 | Trahan | F24F 13/06 248/343 |
| 3,985,158 A | * | 10/1976 | Felter | F16L 9/12 138/103 |
| 4,159,674 A | * | 7/1979 | Brumleu, Jr. | B32B 5/08 428/167 |
| 4,735,235 A | * | 4/1988 | Anderson | F16L 59/16 138/109 |
| 4,858,520 A | * | 8/1989 | Prochnow | F24F 13/06 454/284 |

(Continued)

*Primary Examiner* — Steven B McAllister
*Assistant Examiner* — Jonathan Cotov
(74) *Attorney, Agent, or Firm* — Egbert Law Offices, PLLC

(57) ABSTRACT

A register box for HVAC installations has a body with a plurality of side panels arranged in a generally rectangular or square configuration and a wall extending across the rectangular configuration, a duct opening through the wall so as to communicate with an interior of the body, and an expandable foam polymeric material affixed to an inner side of the side panels. The wall has a surface extending from the opening of the duct to the side panels. The expandable foam polymeric material is affixed to the surface of the wall. The expandable polymeric material is polyurethane.

11 Claims, 5 Drawing Sheets

(56) References Cited

U.S. PATENT DOCUMENTS

| | | | | |
|---|---|---|---|---|
| 5,095,942 | A * | 3/1992 | Murphy | F16L 9/003 137/561 A |
| 5,219,403 | A * | 6/1993 | Murphy | F16L 9/003 137/561 A |
| 5,658,196 | A | 8/1997 | Swaim | |
| 5,749,190 | A * | 5/1998 | Williams | F24F 13/02 454/330 |
| 5,957,506 | A * | 9/1999 | Stepp | F16L 43/00 285/183 |
| 6,231,704 | B1 * | 5/2001 | Carpinetti | F16L 9/003 138/149 |
| 7,699,078 | B1 * | 4/2010 | Husmann, Jr. | F16L 59/04 138/114 |
| 8,667,995 | B1 * | 3/2014 | Fanelli | F24F 13/0245 138/112 |
| 2004/0130154 | A1 * | 7/2004 | Stepp | F16L 13/002 285/424 |
| 2006/0070521 | A1 * | 4/2006 | Stark | F24F 13/0218 95/45 |
| 2007/0261345 | A1 * | 11/2007 | Janka | F24F 13/20 52/404.1 |
| 2008/0014860 | A1 * | 1/2008 | Heitman | F24F 13/062 454/310 |
| 2008/0045137 | A1 * | 2/2008 | Rosal | F24F 13/0245 454/292 |
| 2014/0272212 | A1 * | 9/2014 | Tyler | F24F 13/0263 428/34.1 |
| 2015/0204573 | A1 * | 7/2015 | Gray | F24F 13/0263 428/43 |

* cited by examiner

INSULATED REGISTER BOX AND METHOD FOR FORMING AN INSULATED REGISTER BOX

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to ductwork for heating, ventilation and air-conditioning (HVAC) systems. More particularly, the present invention relates to register boxes as used in such systems. More particularly, the present invention relates to the installation of such register boxes.

2. Description of Related Art Including Information Disclosed Under 37 CFR 1.97 and 37 CFR 1.98.

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C.

Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

It is an object of the present invention to provide a register box and method for forming same which minimizes air loss.

It is another object of the present invention to provide a register box and method for forming same which improves the insulation rating.

It is another object of the present invention to provide a register box and method for forming same which is fire-resistant.

It is another object of the present invention to provide a register box and method for forming same which is compliant with national building codes.

It is another object of the present invention to provide a register box and method for forming same which allows the register boxes to be stackable.

It is another object of the present invention to provide a register box and method for forming same which avoids the use of fibrous insulation.

It is another object of the present invention provide a register box and method for forming same which improves the health and safety to workers assembling the register box.

It is a further object of the present invention to provide a register box and method for forming same which is very energy efficient.

It is still another object of the present invention to provide a register box and method for forming same which allows inspectors to quickly ascertain that the register box is insulated.

It is still a further object of the present invention to provide a register box and method for forming same which does not require the alteration of the structure of the existing register box.

These and other objects and advantages of the present invention will become apparent from a reading of the attached specification and appended claims.

BRIEF SUMMARY OF THE INVENTION

The present invention is a register box for HVAC installation which comprises a body having a plurality of side panels arranged into a generally rectangular or square configuration and having a wall extending across the generally rectangular configuration, a duct opening through the wall so as to communicate with an interior of the body, and an expandable polymeric material affixed to an inner side of the side panels. The wall has a surface extending from the opening of the duct to the side panels of the body. The expandable polymeric material is also affixed to the surface of the wall.

In the present invention, the body has a plurality of flanges extending inwardly respectively from the plurality of side panels at an end opposite the wall. Each of the flanges has a width dimension. The expandable polymeric material is affixed to the inner side of the side panels and has a thickness approximately equal to the width dimension of the flange. The expandable polymeric material extends from the side panel to an edge of the duct.

In the present invention, at least one of the side panels has a seam formed thereon. The expandable polymeric material at least partially extends through the seam so as to reside on an outer side of the side panel. The body also has a seam formed between the duct and the wall. The expandable polymeric material has a portion extending through the seam so as to reside on an outer surface of the duct or an outer surface of the wall. Typically, the duct is tack-welded to the wall of the body. As such, the seam would be formed between the tack welds. In the present invention, the expandable polymeric material is polyurethane.

The present invention is also a method of insulating the register box. This method includes the steps of: (1) introducing a mold into an interior of the register box in which the mold has at least one opening formed therein; (2) flowing an expandable polymeric material into the mold and outwardly through the opening such that the expandable polymeric material is directed to an inner surface of the plurality of sidewalls; (3) solidifying the flowed expandable polymeric material against the plurality of sidewalls; and (4) removing the mold from the interior of the register box.

The mold has a blocking element affixed to a bottom thereof. The mold is moved downwardly into the register box such that the blocking element covers the opening of the duct at the wall. The blocking element has a thickness extending from the bottom of the mold. The method further includes flowing the expanded polymeric material outwardly of the mold toward the wall and around the blocking element and solidifying the expanded polymeric material against the wall such that the solidified expanded polymeric material extends from the side panel to the opening of the duct. There is no solidified expanded polymeric material formed on the interior of the duct.

The register box has a plurality of flanges that extend inwardly respectively from the plurality of side panels at an end thereof opposite the wall. The inner edge of the plurality of flanges defines an aperture. The step of introducing includes moving the mold through the aperture. The step of solidifying includes solidifying the expanded polymeric material against the plurality of sidewalls such that the solidified expanded polymeric material has a thickness approximately equal to the width of the flange.

In the method of the present invention, at least one of the plurality of side panels has a seam. There is also a seam that occurs between the opening of the duct and the wall. The step solidifying can include solidifying the expanded polymeric material such that a portion of the solidified expanded polymeric material emerges through the seam. The method also can include solidifying the expanded polymeric material such that a portion of the solidified expanded polymeric material emerges through the seam. The step of removing the mold is after the step of solidifying.

In the present invention, a carousel is formed which has a plurality of openings thereon. The duct is placed through one of the plurality of openings such that an interior of the register box faces upwardly. The step of placing is prior to the step of introducing the mold into the interior of the register box. The register box is rotated after the step of removing mold such that the register box resides in a position away from the mold. The register box is lifted from the opening of the carousel and then placed onto a stack.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
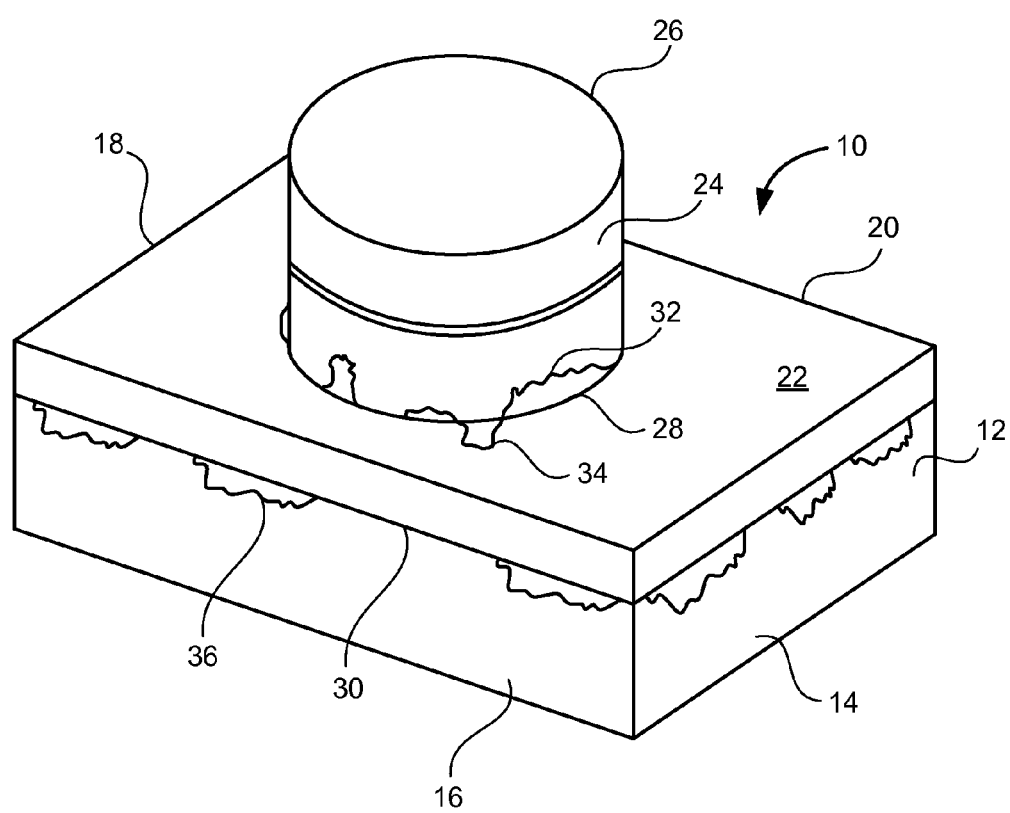
FIG. 1 is a perspective view showing the register box in accordance with the present invention.

Referring to FIG. 1, there is shown the insulated register box 10 in accordance with teachings of the present invention. The register box 10 includes a body 12 having side panels 14, 16, 18 and 20 formed into a generally rectangular configuration. A wall 22 extends across this generally rectangular configuration. A duct 24 is illustrated as affixed to the wall 22 so as to open to the interior of the body 12. The duct 24 includes an open end 26 so as to allow duct 24 to be connected to the HVAC system of a building.

Conventionally, the register box 10 will be formed and pieced together through the use of tack welding. Tack welding is a very efficient manner of forming the register box. Unfortunately, tack welding can often leave gaps and seams in certain areas through which air can penetrate. In particular, the duct 24 can be tack welded to the body 22. Similarly, portions of the body 12 can be tack welded together. As illustrated in FIG. 1, there is a seam 28 that occurs between the duct 24 and the wall 22 of body 12 and also a seam 30 that is located on the side panels 14 and 16.

As will be described hereinafter, an expandable polymeric material, such as polyurethane, is applied for the purposes of insulating the interior of the body 12. In FIG. 1, it can be seen that a portion 32 of the expanded polymeric material actually emerges through the seam 28 so as to reside outwardly on the exterior of the duct 24. Another portion 34 of the expanded polymeric material is illustrated as residing on an exterior surface of the wall 22. Similarly, a portion of the expanded polymeric material 36 extends outwardly through the seam 30 and resides on the exterior of the body 12. This is an important feature of the present invention.

Fundamentally, expanded polyurethane material will expand in an irregular manner. As such, as the polyurethane material expands, it will tend to flow through any pores, gaps, seams and openings. As such, the various portions 32, 34 and 36 of the expanded polymeric material will actually penetrate through the seams. This effectively closes the seams and enhances the air-tightness of the register box 10. Additionally, since this expanded polymeric material can actually be seen on the exterior of the register box, it can be easily viewed by inspectors to see if a register box is insulated or not. To enhance this quality, the expanded polymeric material should be of a different color than the color of the register box. As such, although this seepage of the expanded polymeric material creates an unpleasing and unaesthetic appearance, it facilitates installation and facilitates inspection. Since the register box 10 is typically maintained in an unobservable location, the unpleasing appearance of this seepage is of little or no aesthetic importance.

Figure 2:
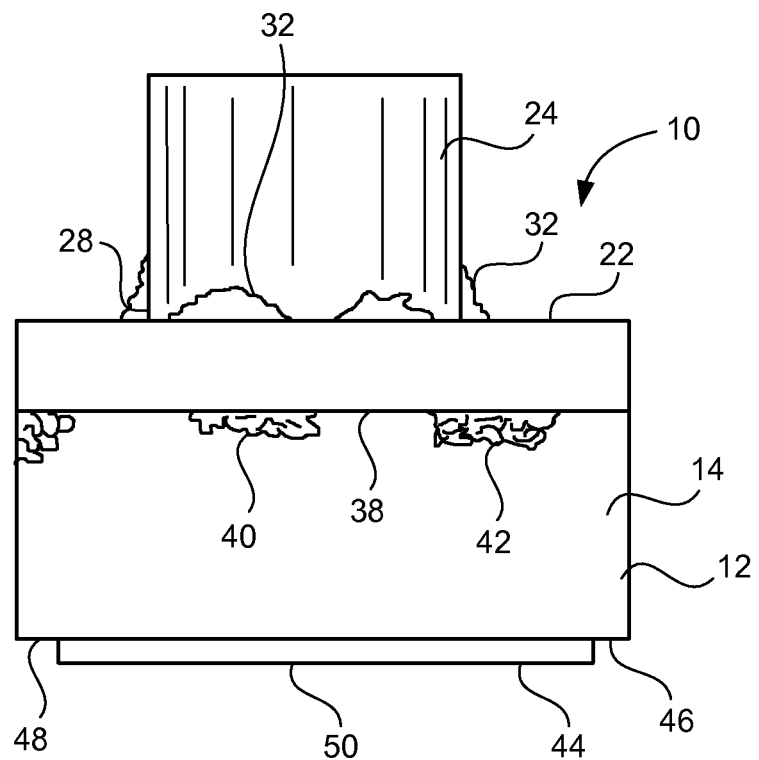
FIG. 2 is a side elevational view of the register box in accordance with the present invention.

FIG. 2 shows a side view of the register box 10. As can be seen in FIG. 2, the side panel 14 is particularly illustrated. Side panel 14 includes another seam 38. Portions 40 and 42 of the expanded polymeric material are illustrated as emerging out of the seam 38. Additionally, the duct 24 is illustrated as affixed to and extending outwardly of the wall 22. The portions 32 of the expanded polymeric material are illustrated as extending between through the seam 28 between the duct 24 and the wall 22 and residing on the exterior of the duct 24. In FIG. 2, it can be seen that there is a lip 44 that extends outwardly of the end 46 of the body 12. The lip 44, as will be described hereinafter, extends outwardly of a flange 48. Flange 48 extends inwardly from the side panels 14, 16, 18 and 20 such that the inner edges define an aperture 50 opening to the interior of the body 12.

Figure 3:
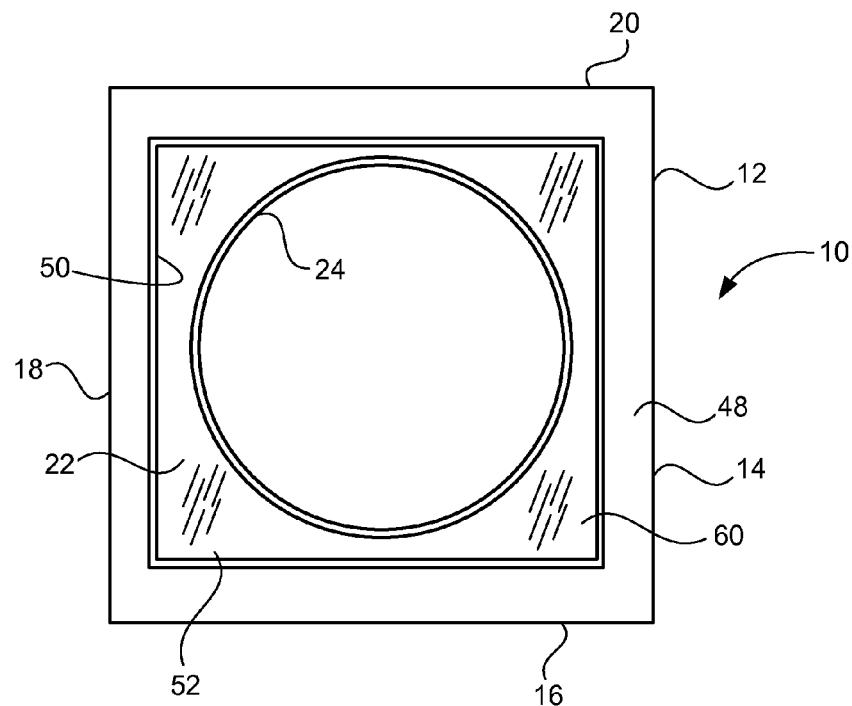
FIG. 3 is a end view of the register box in accordance with the present invention.

FIG. 3 is an end view of the register box 10 of the present invention. In FIG. 3, it can be seen that the duct 24 is affixed to the wall 22. Wall 22 includes a surface 52 that extends from the opening of the duct 24 to the side panels 14, 16, 18 and 20 of the body 12. In FIG. 3, it can be seen that the expanded polymeric material 60 resides over the surface 52 and extends to the side panels 14, 16, 18 and 20. As such, the expanded polymeric material 90 effectively insulates the wall 22 in the area adjacent to the opening of the duct 24.

FIG. 3 further shows the nature of the flanges 48. Flange 48 is illustrated as extending around the interior of the body 12. Flange 48 has a particular width. In accordance with the present invention, and as will be described in association with FIG. 4, the expanded polymeric material 60 will reside against the side panels 14, 16, 18 and 20 and have a thickness approximately equal to the width of the flanges 48. The lip 50 is illustrated as extending in transverse relationship from the flange 48.

Figure 4:
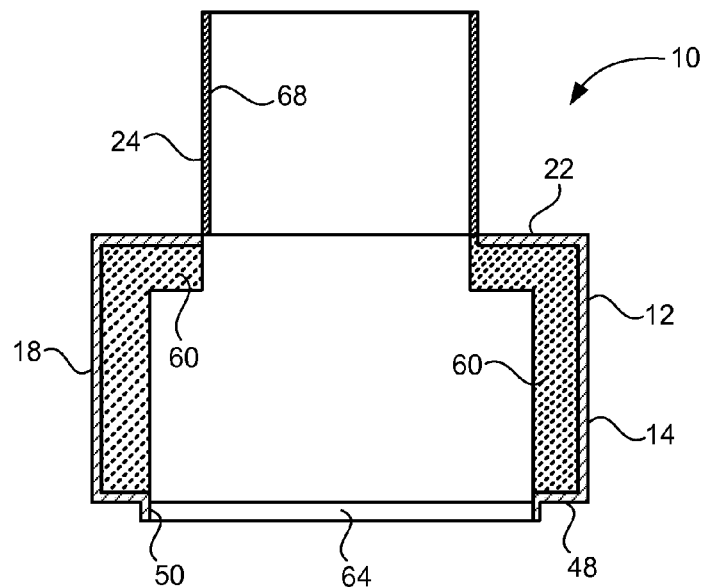
FIG. 4 is a cross-sectional view of the register box of the present invention.

FIG. 4 is a cross-sectional view of the register box 10 of the present invention. As can be seen in FIG. 4, the expanded polymeric material 60 is illustrated as positioned against the side panels 14 and 18. A similar configuration, such as shown in FIG. 4, will occur with respect to the side panels 16 and 20. The expanded polymeric material 60 is illustrated as having a thickness approximately equal to the width dimension of the flange 48. The flange 48, along with the lip 50 defines an aperture 64 that opens to the interior of the body 12. The expanded polymeric material 60 also has a portion 60 that resides against the inner surface of the wall 22. This portion 60 extends from the side panels 14 and 18 so as to generally be aligned with the opening of the duct 24.

In this configuration, the expanded polymeric material 60 can serve as an insulation. This installation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expanded polymeric material 60 does not require any alterations in the structure of the body 12 or of the duct 24. The insulation material causes the register box 10 to be very energy efficient. Also, since the expanded polymeric material 60 enters and emerges through the various openings, gaps, seams, and holes in the register box 10, it minimizes air loss and improves inspectability.

In FIG. 4, it can be seen that there is no expanded polymeric material located on the inner wall 68 of the duct 24. If any expanded polymeric material would enter the duct 24 or reside on the inner wall 68 of the duct 24, then it could hamper air circulation. As such, it was felt that it was important to block any movement of the expanded polymeric material from entering the area on the interior of the duct 24. Since the expanded polymeric material 60 extends to the aperture 64 that is defined by the lips 50 and the flanges 48, it does not interfere with airflow into the interior of the register box. As such, the present invention remains substantially aerodynamic while, at the same time, improving the insulating qualities required of the register box 10.

Figure 5:
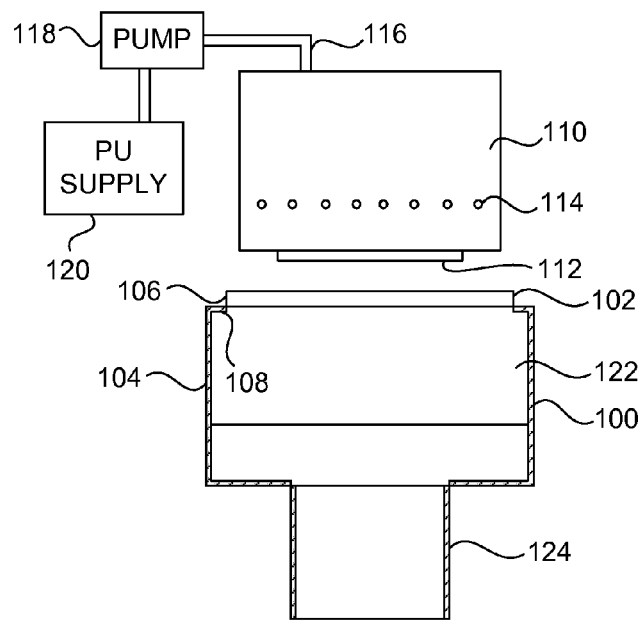
FIG. 5 shows an initial step in the formation of the insulated register box of the present invention.

FIG. 5 shows a first step in the method of the present invention and, in particular, the formation of the insulating material on the interior of the register box. In FIG. 5, there is shown a register box 100 that is of a similar nature as the register box 10 of the previous figures. The register box 100 is shown as having an aperture 102 located at the top of the body 104. The aperture 102, as with the previous figures, is defined by the lips 106 and the flanges 108. The register box 100, shown in FIG. 5, is in the nature of a standard register box.

Importantly, the present invention, a mold 110 is formed. The mold 110 includes a blocking element 112 at the bottom thereof. A plurality of openings 114 are formed through the wall of the mold 110. The mold 110 also includes an inlet 116 so as to allow the expanded polymeric material to be introduced into the interior of the mold 100. A pump 118 is connected to the inlet 106 and also to a supply of the expanded polymeric material 120. When the pump is activated, the expanded polymeric material, preferably polyurethane, is pumped through the inlet 116 into the interior of the mold 110.

In FIG. 5, the mold 110 is slightly less than the size of the aperture 102. As such, the mold 110 can easily fit into the interior 122 of the register box 100. The blocking element 112 has a size slightly greater than the diameter of the duct 124. As such, when the mold 110 is installed into the interior 122 of the register box 100, the blocking element 112 will fit over the interior of the duct 124 so as to block any expanded polymeric material from entering the interior of the duct 124.

Figure 6:
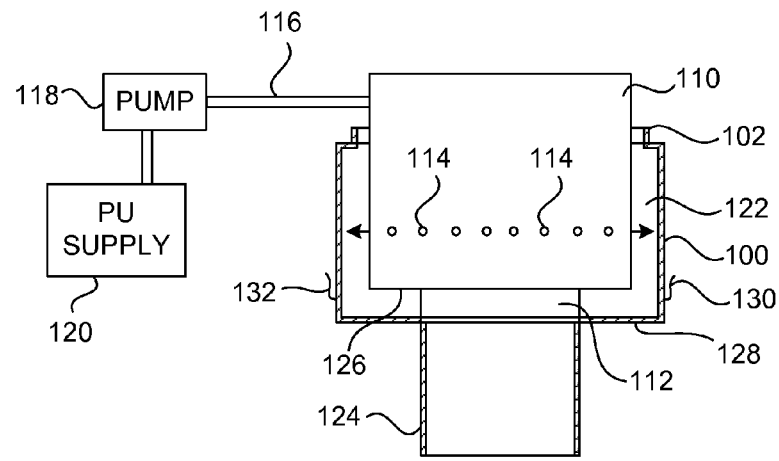
FIG. 6 shows a further step in the method of forming the insulated register box of the present invention.

FIG. 6 shows the introduction of the mold 110 into the interior 122 of the register box 100. It can be seen that the mold 110 has been inserted through the aperture 102. The blocking element 112 fits over the opening of the duct 124. The blocking element 112 supports the bottom 126 a desired distance above the inner surface of the wall 128.

When the pump 118 is activated, it will draw the expanded polymeric material from the supply 120 so as to deliver the expanded polymeric material through the inlet 116 and into the interior of the mold 110. This expanded polymeric material will then exit through the openings 114 and into the interior 122 of the register box 100. As such, the expanded polymeric material will flow in a direction toward the inner surface of the side panels and also directed toward the inner surface of the wall 128. The mold 110 will remain in the position shown in FIG. 4 during the solidification of the expanded polymeric material. The solidified expanded polymeric material can include portions 130 and 132 that emerge through small cracks or gaps in the seams associated with the register box 100. After the expanded polymeric material has solidified, the mold 110 is removed so that the insulating expanded polymeric material will have an appearance similar to that shown in FIG. 4.

Figure 7:
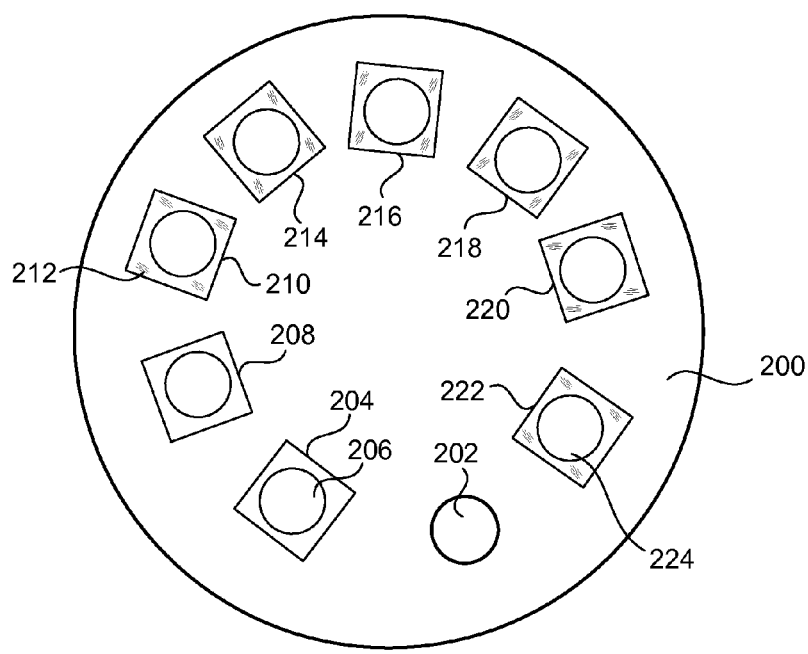
FIG. 7 is a plan view showing the carousel as used in the method of forming the register box of the present invention.

The process of the present invention greatly improves the efficiency of the production of insulated register boxes. In the past, a great deal of manual activity was required so as to install the fibrous insulating material against the various side panels and wall of the register box. In the present invention, since fibrous insulating material is not required, the present invention can rapidly create insulated register boxes. FIG. 7 shows a carousel 200 that is provided with a plurality of openings 202. The use of the carousel 200 facilitates the ability for a single worker, or a pair of workers, to rapidly produce the insulated register boxes.

In FIG. 7, it can be seen that there is a register box 204 that has been inserted into an opening 206. In particular, the duct of the register box 204 is placed into the opening 206. As such, the interior of the body of the register box will face upwardly from the carousel 200. Another uninsulated register box 208 resides in another opening adjacent to the register box 204. Register box 210 is illustrated as being in the process of installing the insulating material 212. The insulating material 212 is installed into the interior of the body of the register box 210 in the manner described herein previously. After the insulating material has solidified, the carousel 200 is rotated so that the uninsulated register box 204 is now available for receiving the insulating material therein.

The various register boxes 214, 216, 218, 220, and 222 can proceed to be rotated with the carousel 200 during the production activities. Ultimately, the register box 222 is in a position suitable for removal by worker located adjacent to the register box 222. The register box 222 can be lifted from the opening 224 and then stacked to the side. Unlike previous insulated register boxes, the process of the present invention greatly facilitates the ability to stack. Since the expanded polymeric material will solidify in approximately two minutes, the process associated with carousel 200 is relatively rapid.

Figure 8:
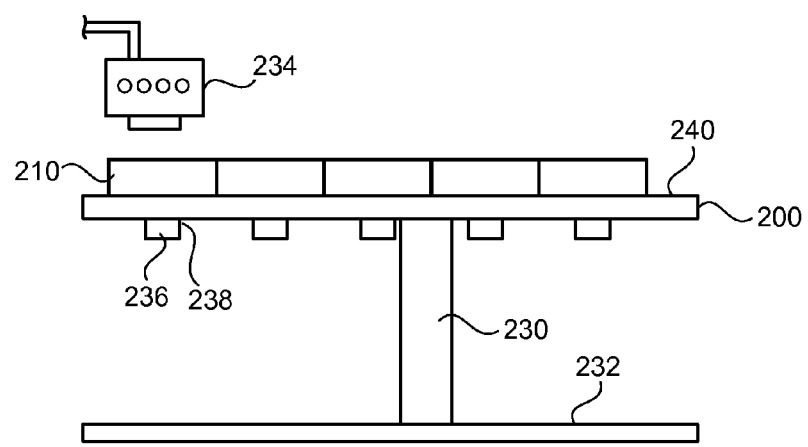
FIG. 8 is a side elevational view of the carousel and mold as used in the formation of the insulated register box of the present invention.

FIG. 8 is a side view showing the arrangement of the carousel 200 and the various register boxes thereon. In particular, in FIG. 8, it can be seen that the carousel 200 is rotatably mounted upon a support 230. The support 230 is maintained in an upright position by a base 232. The mold 234 is illustrated as located in a position above the register box 210. As such, the mold 234 can be lowered so as to deliver the expanded polymeric material into the register box 210. The register box 210 is maintained in a proper position by inserting the duct 236 into the opening 238 in the carousel 200. The various other register boxes are illustrated as also supported on the top surface 240 of the carousel 200.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A method of insulating a register box, the register box having a plurality of side panels arranged in a generally rectangular or square configuration and a duct opening through a wall that extends across the generally rectangular or square configuration, the method comprising:
   introducing a mold into an interior of the register box, the mold having an opening formed therein;
   flowing an expandable polymeric material into the mold and outwardly through said opening such that the expandable polymeric material is directed to an inner surface of said plurality of side panels;
   solidifying the flowed expandable polymeric material against said plurality of side panels; and
   removing said mold from said interior of said register box.

2. The method of claim 1, said mold having a blocking element affixed to a bottom thereof, the step of introducing comprising:
   moving said mold downwardly into said register box such that said blocking element covers the opening of said duct at said wall.

3. The method of claim 2, said blocking element having a thickness extending from said bottom of said mold, the method further comprising:
   flowing the expandable polymeric material outwardly of said mold toward the wall and around said blocking element; and
   solidifying the expandable polymeric material against said wall such that the solidified expandable polymeric material extends from the side panel to the opening of the duct.

4. The method of claim 1, said register box having a plurality of flanges extending inwardly respectively from said plurality of side panels at an end thereof opposite said wall, said plurality of flanges defining an aperture, the step of introducing comprising:
   moving said mold downwardly through said aperture.

5. The method of claim 4, the step of solidifying comprising:
   solidifying the expandable polymeric material against said plurality of side panels such that solidified expandable polymeric material has a thickness approximately equal to a width of the flange.

6. The method of claim 1, at least one of said plurality of side panels having a seam, the step of solidifying comprising:
   solidifying the expandable polymeric material such that a portion of the solidified expandable polymeric material emerges through the seam.

7. The method of claim 1, said wall having a seam adjacent the opening of the duct, the step of solidifying comprising:
   solidifying the expandable polymeric material such that a portion of the solidified expandable polymeric material emerges through the seam.

8. The method of claim 1, the step of removing said mold being after the step of solidifying.

9. The method of claim 1, further comprising:
   forming a carousel having a plurality of openings thereon; and
   placing said duct through one of said plurality of openings such that an interior of said register box faces upwardly, the step of placing being prior to the step of introducing.

10. The method of claim 9, further comprising:
    rotating said carousel after the step of removing such that said register box resides in a position away from said mold;
    lifting the register box from the opening of the carousel; and
    placing the lifted register box onto a stack.

11. The method of claim 1, said expandable polymeric material being polyurethane.

* * * * *